US012116266B1

(12) United States Patent
Koehl et al.

(10) Patent No.: US 12,116,266 B1
(45) Date of Patent: Oct. 15, 2024

(54) BACK CINCH AND METHOD OF USE

(71) Applicants: Troy Koehl, Montgomery, TX (US); Cory Shaver, Montgomery, TX (US)

(72) Inventors: Troy Koehl, Montgomery, TX (US); Cory Shaver, Montgomery, TX (US)

( * ) Notice: Subject to any disclaimer, the term of this patent is extended or adjusted under 35 U.S.C. 154(b) by 0 days.

(21) Appl. No.: 18/139,775

(22) Filed: Apr. 26, 2023

Related U.S. Application Data

(60) Provisional application No. 63/407,477, filed on Sep. 16, 2022.

(51) Int. Cl.
*B68C 1/14* (2006.01)

(52) U.S. Cl.
CPC .......... *B68C 1/14* (2013.01); *B68C 2001/142* (2013.01)

(58) Field of Classification Search
CPC ................ B68C 1/14; B68C 2001/142; B68C 2001/145
See application file for complete search history.

(56) References Cited

U.S. PATENT DOCUMENTS

| | | | | |
|---|---|---|---|---|
| 2,130,214 A * | 9/1938 | Wright | B68C 1/14 | 54/23 |
| 2,248,697 A * | 7/1941 | Durham | B68C 1/14 | 54/46.1 |
| 4,570,424 A * | 2/1986 | Simpson | B68C 1/14 | 54/23 |
| 6,502,376 B1 * | 1/2003 | Swain | B68C 1/14 | 54/23 |

FOREIGN PATENT DOCUMENTS

| | | | |
|---|---|---|---|
| DE | 202011002276 U1 * | 7/2011 | B68C 1/005 |
| FR | 440307 A * | 7/1912 | |

* cited by examiner

*Primary Examiner* — Jessica B Wong
(74) *Attorney, Agent, or Firm* — Richard G Eldredge; Leavitt Eldredge law Firm

(57) ABSTRACT

A back cinch for providing improved horseback riding safety is disclosed. The back cinch includes an elongated, non-linear body, a pair of latigo buckle assemblies, a girth buckle assembly, and a connecting strap; wherein the body wraps around the girth of a horse; wherein the pair of latigo buckle assemblies removably engage with a side of a saddle.

3 Claims, 5 Drawing Sheets

BACK CINCH AND METHOD OF USE

BACKGROUND

1. Field of the Invention

The present invention relates generally to saddles, and more specifically to a back cinch for keeping a saddle in position on a back of an animal.

2. Description of Related Art

Saddles have long been used for providing supportive structure for a rider of an animal such as horses, donkeys, oxen, camels, and other animals. Saddles designed for horseback riding are typically placed over a horse's back and are held in place by a cinch or girth. Generally, the cinch passes under the girth of the horse and attaches to each side of the saddle by a latigo or billet.

One of the problems commonly associated with conventional cinches is their substantially straight shape. For example, during horseback riding, the rider's spur often gets caught in the cinch when cuing directions to the horse. In addition, incorrect cuing poses a safety hazard for both the rider and the horse. Hence, it would be advantageous to have a cinch that prevents the rider's spur from getting caught therein, thereby allowing the rider to cue directions correctly and safely.

Accordingly, it is an object of the present invention to provide a back cinch that addresses the limitations discussed above.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
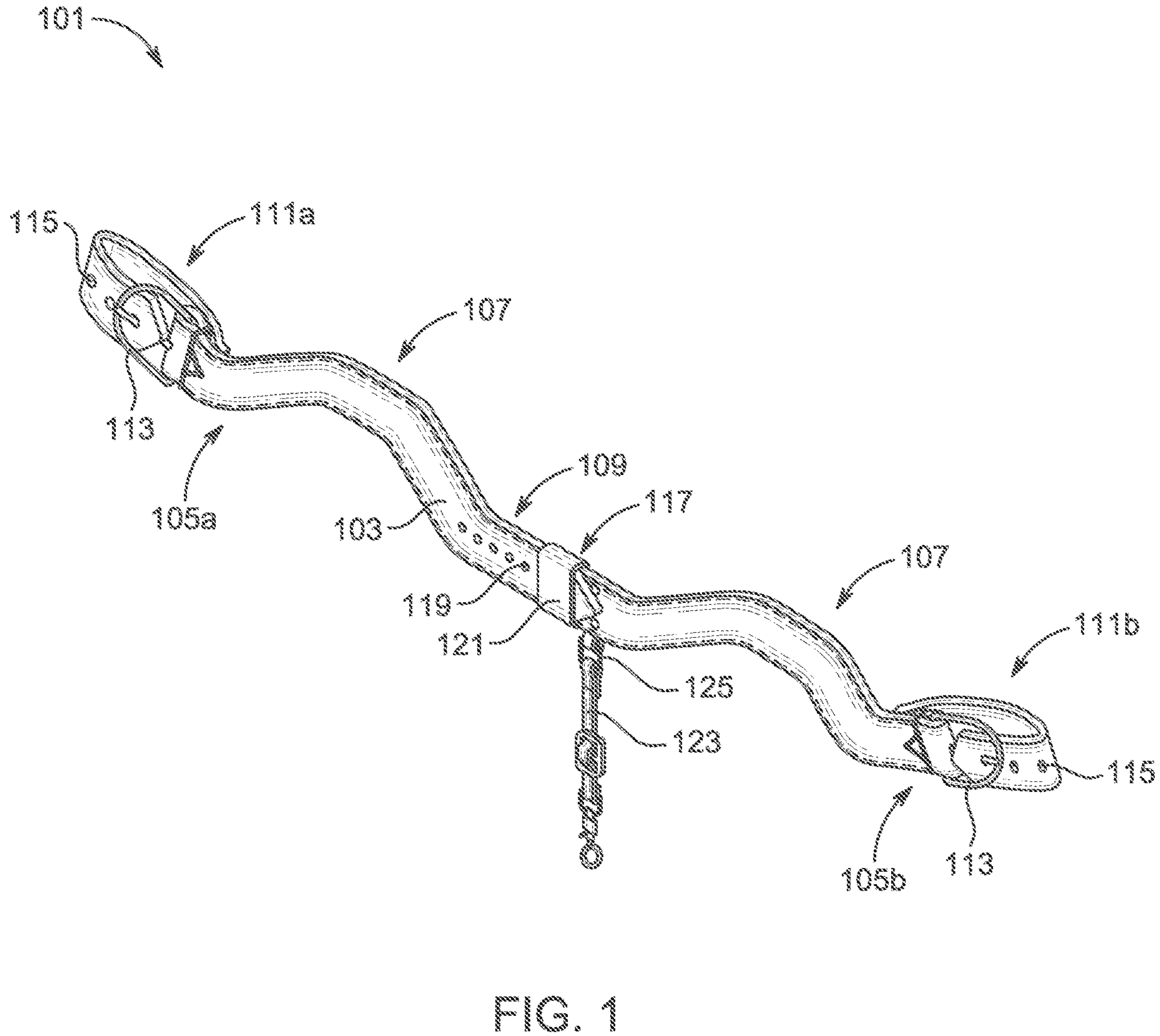
FIG. 1 is a top isometric view of a back cinch in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional cinches. Specifically, the present invention provides a back cinch that secures a saddle on an animal's back in place and prevents a rider's spurs from getting caught. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
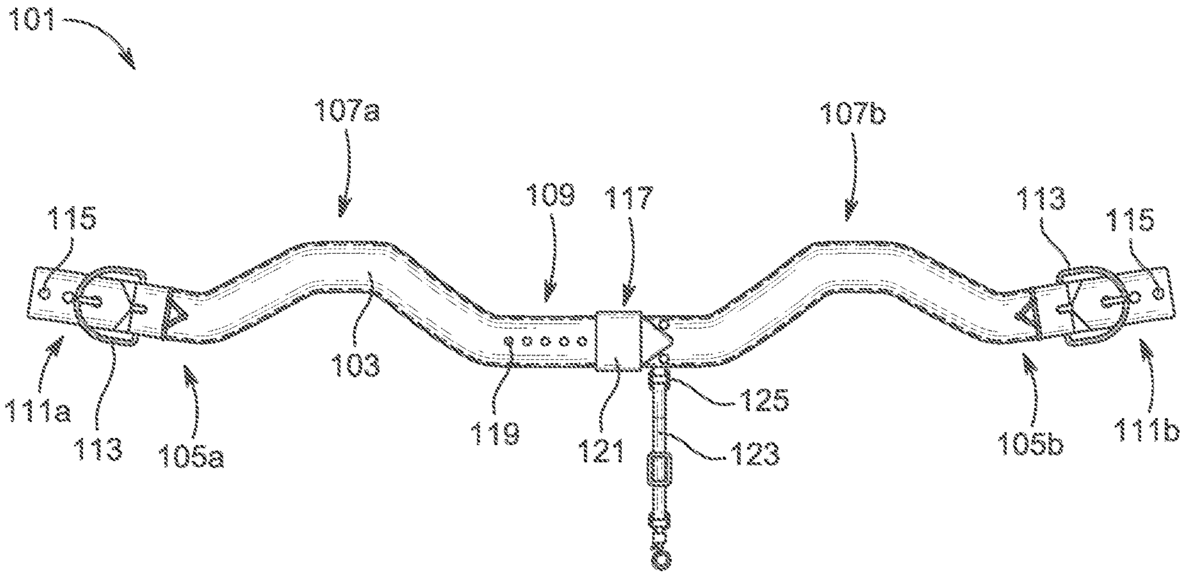
FIG. 2 is a front view of the back cinch of FIG. 1.
Figure 3:
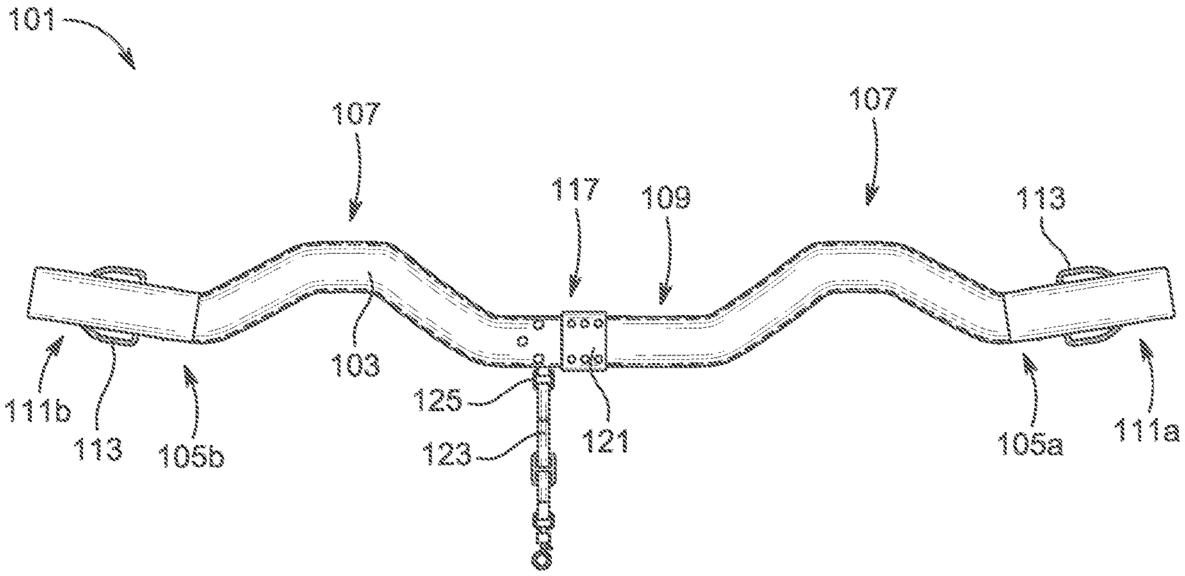
FIG. 3 is a rear view of the back cinch of FIG. 1.

Referring now to the drawings wherein like reference characters identify corresponding or similar elements throughout the several views, FIGS. 1 through 3 depict various views of a back cinch 101 in accordance with a preferred embodiment of the present application. It will be appreciated that the back cinch 101 overcomes one or more of the above-listed problems commonly associated with conventional cinches.

In the contemplated embodiment, the back cinch 101 includes an elongated, non-linear shaped body 103 having opposing ends 105*a*, 105*b*, one or more relatively curved segments 107, and a relatively straight segment 109.

The back cinch 101 also includes a pair of latigo buckle assemblies 111*a*, 111*b*, wherein one latigo buckle assembly of the pair of latigo buckle assemblies 111*a*, 111*b* joins one opposing end of the body 103 via a D-ring 113. It should be understood that each latigo buckle assembly removably engages with a side of a saddle. The latigo buckle assemblies 111*a*, 111*b* include a plurality of holes 115 for providing adjustability when removably engaging with a side of a saddle.

The back cinch 101 also includes a girth buckle assembly 117 positioned on segment 109. The girth buckle assembly 117 includes a plurality of holes 119 and a buckle cover 121. The plurality of holes 119 allow the user to adjust the girth buckle assembly 117 to accommodate the size of a horse's girth. The buckle cover 121 prevents the girth buckle assembly 117 from jostling during use.

The back cinch 101 further includes a connecting strap 123 coupled to segment 109 via a D-ring 125. The connecting strap 123 can connect to a front cinch.

It should be appreciated that the back cinch 101 may be made from any suitable or desirable materials, including conventional materials known and used in the art, such as leather, nylon, rayon, felt, cotton, neoprene, natural hair fibers (e.g., mohair, alpaca, goat, etc.), combinations of various materials, and the like. It should also be appreciated that the cinch 101 may be formed from any currently known or later developed material suitable for cinches.

In addition, it should be appreciated that the back cinch 101 can have a wide range of thicknesses, weights, densities, etc., depending upon the size requirements of the rider and horse. The back cinch 101 can also include different colored materials, different colored patterns, images and the like to achieve a desired aesthetic.

It should also be appreciated that one of the unique features believed characteristic of the present application is the non-linear shaped body 103 that prevents a rider's spurs from becoming caught thereon while the body 103 is positioned against the girth of a horse, thereby enabling correct cuing from the rider, thereby improving safety for both the rider and horse.

Figure 4:
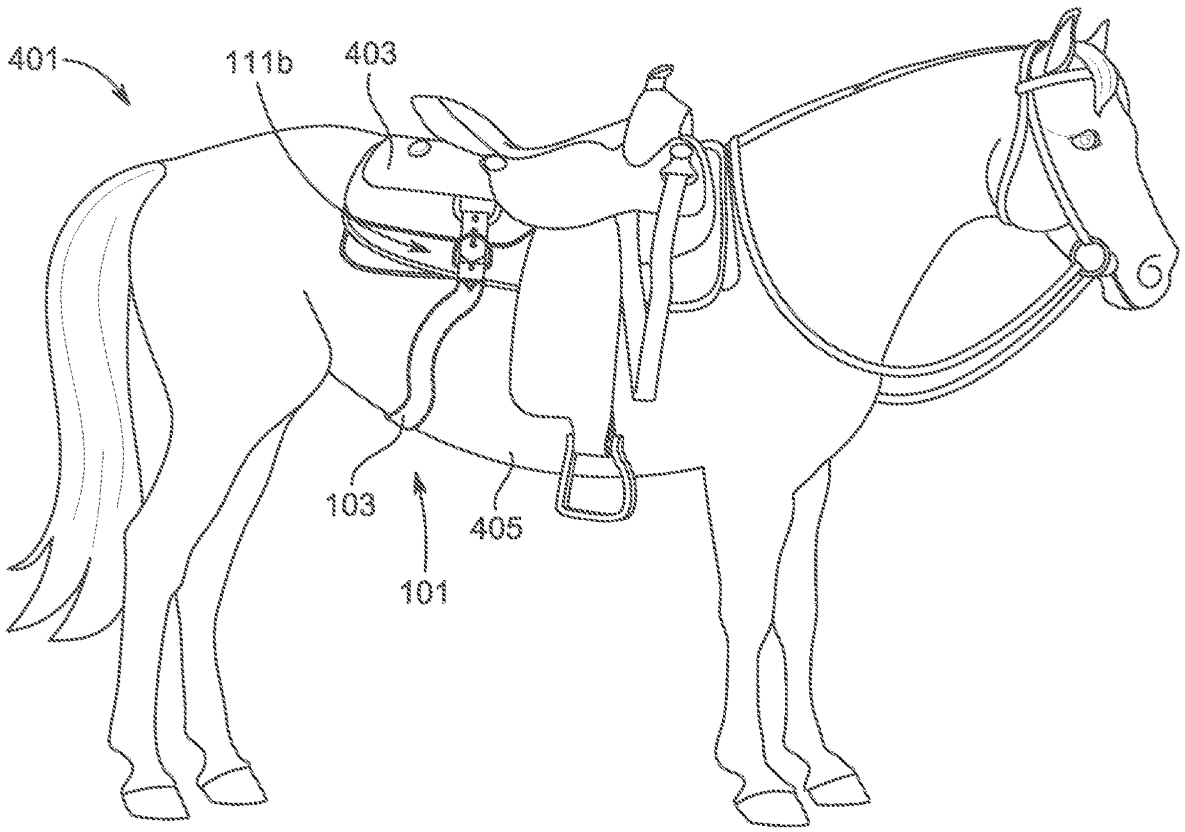
FIG. 4 is a perspective view of the back cinch of FIG. 1 in use, keeping a saddle in position on a horse.

In FIG. 4, a perspective view of the back cinch 101 is shown in use on a horse 401. As shown, a saddle 403 is positioned on the horse 401. The latigo buckle assembly 111*b* engages with a side of the saddle 403. The body 103 wraps around the girth 405 of the horse 401 and holds the saddle 403 in place.

Figure 5:
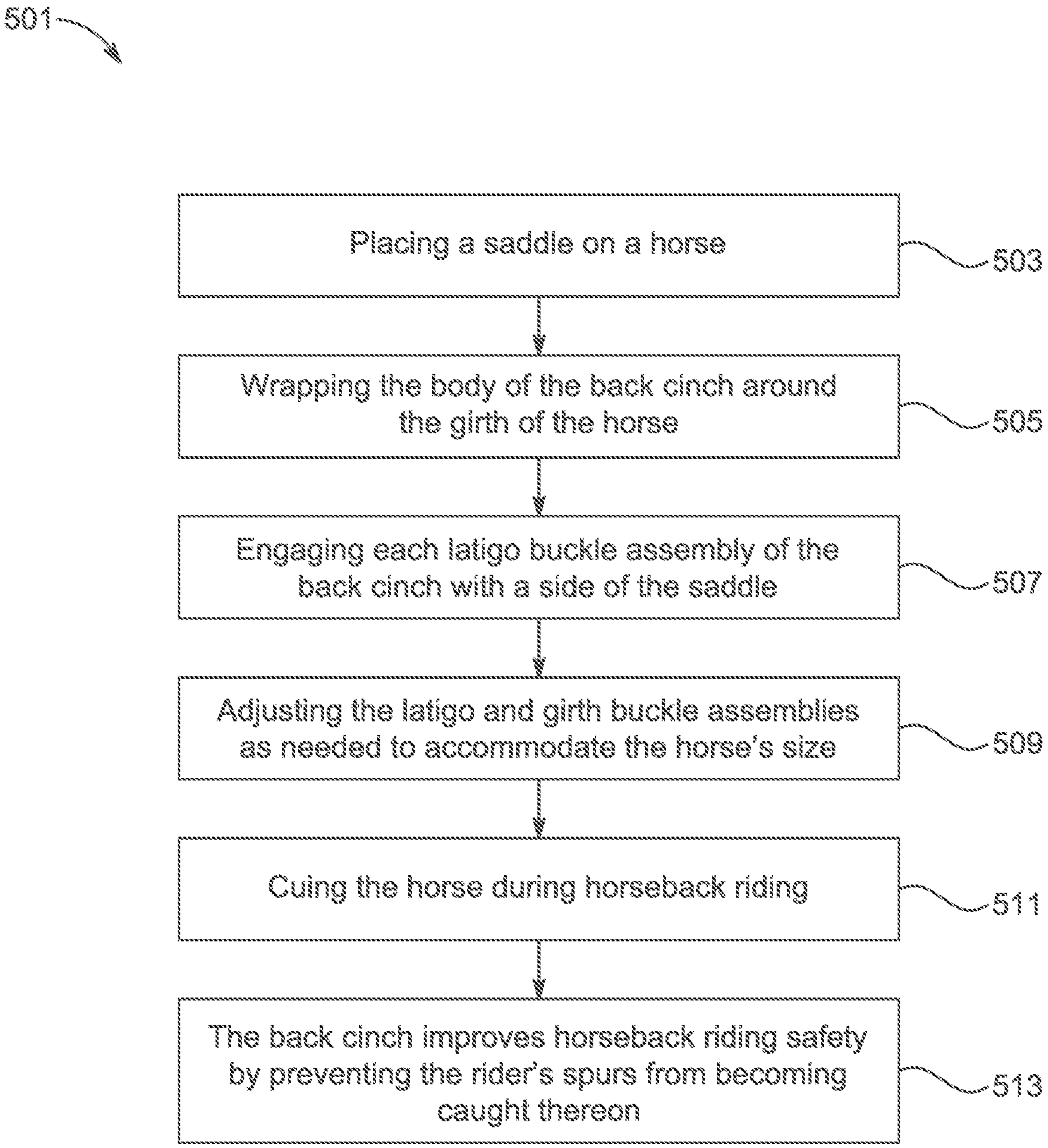
FIG. 5 is a flowchart of a method of use of the back cinch of FIG. 1.

In FIG. 5, a flowchart 501 depicts a method of use associated with the back cinch 101. During use, once a saddle is placed on a horse, the body of the back cinch is placed against the girth of the horse, as shown with boxes 503, 505. Then, each latigo buckle assembly of the back cinch engages with a side of the saddle, as shown with box 507. The latigo and girth buckle assemblies can be adjusted as needed to accommodate the horse's size, as shown with box 509. While cuing the horse during horseback riding, the back cinch improves horseback riding safety by preventing the rider's spurs from becoming caught on thereon, as shown with boxes 511, 513.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A back cinch, comprising:
- an elongated, non-linear shaped body, the body having:
  - opposing ends;
  - one or more relatively curved segments; and
  - a relatively straight segment;
- a pair of latigo buckle assemblies configured to removably engage with a side of a saddle, wherein one latigo buckle assembly of the pair of latigo buckle assemblies joins an opposing end of the body via a D-ring, wherein each latigo buckle assembly includes a plurality of holes for providing adjustability;
- a girth buckle assembly positioned on the relatively straight segment, the girth buckle having:
  - a plurality of holes for providing adjustability; and
  - a buckle cover for preventing the girth buckle assembly from jostling during use; and
- a connecting strap coupled to the relatively straight segment via a D-ring.

2. The back cinch of claim 1, wherein the body is made of leather.

3. A method for improving horseback riding safety, the method comprising:
- providing a back cinch, the cinch comprising:
  - an elongated, non-linear shaped body, the body having:
    - opposing ends;
    - one or more relatively curved segments; and
    - a relatively straight segment;
  - a pair of latigo buckle assemblies configured to removably engage with a side of a saddle, wherein one latigo buckle assembly of the pair of latigo buckle assemblies joins an opposing end of the body via a D-ring, wherein each latigo buckle assembly includes a plurality of holes for providing adjustability;
  - a girth buckle assembly positioned on the relatively straight segment, the girth buckle having:
    - a plurality of holes for providing adjustability; and
    - a buckle cover for preventing the girth buckle assembly from jostling during use; and
  - a connecting strap coupled to the relatively straight segment via a D-ring;
- wrapping the body of the back cinch around the girth of a horse;
- engaging each latigo buckle assembly with a side of a saddle on the horse;
- adjusting the latigo buckle assemblies and the girth buckle assembly as needed to accommodate the horse's size; and
- cuing the horse during horseback riding.

* * * * *